United States Patent [19]

Morioka et al.

[11] Patent Number: 4,993,200

[45] Date of Patent: Feb. 19, 1991

[54] POLLUTION FREE BLASTER SYSTEM AND BLASTER HEAD THEREFOR

[75] Inventors: Junichi Morioka, Chiba; Hiromitsu Mouri, Tokyo; Iwao Atsuchi, Osaka, all of Japan

[73] Assignees: Kawasaki Steel Techno-Research Corp; Kawatetsu Kisai Kogyo Co., both of Tokyo; Atsuchi Tekko Co., Osaka, all of Japan

[21] Appl. No.: 24,149

[22] Filed: Mar. 10, 1987

[30] Foreign Application Priority Data

| Mar. 11, 1986 [JP] | Japan | 61-54376 |
| Mar. 11, 1986 [JP] | Japan | 61-54377 |
| Mar. 11, 1986 [JP] | Japan | 61-54378 |
| Mar. 11, 1986 [JP] | Japan | 61-35749 |
| Mar. 11, 1986 [JP] | Japan | 61-35750 |

[51] Int. Cl.$^5$ .................................................. B24C 3/06
[52] U.S. Cl. ....................................... 51/426; 51/424; 51/429; 51/436; 51/439
[58] Field of Search ................. 51/424, 426, 429, 410, 51/319, 206 R, 270, 207; 181/292, 207; 98/DIG. 10, 48.02, 115.4; 406/152

[56] References Cited

U.S. PATENT DOCUMENTS

| 3,407,538 | 10/1968 | Codina | 51/429 |
| 3,715,838 | 2/1973 | Young | 51/439 |
| 3,799,703 | 3/1974 | Paine | 98/42.08 |
| 4,062,153 | 12/1977 | Malm | 51/207 |
| 4,149,345 | 4/1979 | Atsuchi | 51/439 |
| 4,319,436 | 3/1982 | Van Fossen | 51/429 |
| 4,394,256 | 7/1983 | Goff | 51/429 |
| 4,433,021 | 2/1984 | Riel | 181/292 |
| 4,445,809 | 5/1984 | Schmety | 406/152 |
| 4,549,456 | 10/1985 | Elmaraghy | 181/205 |
| 4,563,840 | 6/1986 | Urakami | 51/439 |
| 4,624,080 | 11/1986 | Jakobsson | 51/410 |

FOREIGN PATENT DOCUMENTS

| 0052161 | 7/1981 | European Pat. Off. | 51/424 |
| 52-44837 | 11/1977 | Japan . |
| 52-44838 | 11/1977 | Japan . |
| 53-16989 | 2/1978 | Japan . |
| 59-193657 | 12/1984 | Japan . |

Primary Examiner—Frederick R. Schmidt
Assistant Examiner—Blynn Shideler
Attorney, Agent, or Firm—Austin R. Miller

[57] ABSTRACT

A sandblaster system employs a blaster head which includes an essentially bowl-shaped blaster hood defining an internal collecting chamber. A blaster nozzle is inserted into the internal collecting chamber of the blaster hood and directed toward a surface to be treated. The blaster nozzle is connected to a source of working abrasive, such as working sand, to inject or discharge the working abrasive via pressurized air onto the surface to be treated. A sucking nozzle is also inserted into the internal collecting chamber of the blaster hood for removing pollutants generated in the blasting operation, such as dust, mine dust, removed rust metal and so forth, along with working abrasive. The sucking nozzle is connected to a vacuum source for inducting the the pollutant and the working abrasive to. On the other hand, the blaster hood is provided with elastic or resilient sealing member on the preripheral edge mating the surface to be treated. The sealing member resiliently contacts the surface for establishing dust-proofing seal to assure prevention of pollution.

40 Claims, 3 Drawing Sheets

POLLUTION FREE BLASTER SYSTEM AND BLASTER HEAD THEREFOR

BACKGROUND OF THE INVENTION

1. Field of the Invention

The present invention relates generally to a sandblaster system. More specifically, the invention relates to a pollution free blaster system which prevents pollution due to dust, mine dust and so forth generated during blasting operation. The present invention also relates to a blaster head useful in the blaster system.

2. Description of the Background Art

Sandblasters are useful in removing weathered surface of concrete constructions, such as buildings and so forth, and rust on steel constructions, such as bridges, ships, gas tanks and so forth. On the other hand, Such sandblasters necessarily generate dust, mine dust and so forth and thus create pollution, during sandblasting operations. Therefore, in many cases, relatively large scale operations, such as covering the portion of the construction with a large sheet or tent, are required to prevent the dust, mine dust and so forth, from being a source of pollution.

In order to avoid such necessity, there has been proposed a wall blaster in U.S. Pat. No. 4,149,345, issued on April 17, 1979, to Iwao ATSUCHI. The wall blaster which is disclosed, comprises a plurality of sand injection nozzles so disposed as to be directed toward an opening of a sandblaster housing facing a surface to be treated for injecting working sand or other abrasive agent toward the surface to be treated, a working sand collecting chamber provided at the lower portion of the sandblaster housing for collecting the working sand injected from the injection nozzles and deflected from the surface to be treated, a plurality of compressed air injection tubes so disposed in the vicinity of the base of the respective injection nozzles as to direct the head of the tube toward the base of the nozzle and also to an open end of a sand house communicating with the collecting chamber in the vicinity there of for taking up the sand in the collecting chamber by means of an ejecting action of a high speed jet air flow injected therefrom and for reinjecting the sand from the injection nozzles to circulate the sand in the housing, upper and lower wheels provided at the front surface of the housing and a permanent magnet disposed at the front surface of the housing wherein the housing is arranged adjacent to the hull surface to be treated so as to be moveable along the hull surface while injecting the working sand from the injection nozzle.

For a similar purpose, the Japanese Utility Model First Publication (Jikkai) Showa 59-193657, published on Dec. 22, 1984 discloses a sandblasting device which has a sandblasting nozzle housed within a collecting hood. The sandblasting nozzle is connected to a feed hose through which the working sand or abrasive is fed via pressurized air and is designed for injecting working sand or other abrasive toward the surface to be treated. A collecting hood is connected to a collecting hose to collect the injected working sand or abrasive. The feed hose extends coaxially with the collecting hose. In the disclosed sandblasting device, the working sand or abrasive injected from the blasting nozzle is collected by means of the collecting hood and recirculated through the collecting hose.

Such sandblasters of the prior art are effective in preventing some of the dust, mine dust or so forth generated during the blasting operation from being discharged into the atmosphere. However, they do not yet completely prevent pollution from occurring during sandblasting operation.

SUMMARY OF THE INVENTION

Therefore, it is an object of the present invention to provide a pollution free sandblaster system which can satisfactorily prevent pollution which would otherwise be caused by dust, mine dust and so forth generated during blasting operation.

Another object of the invention is to provide a novel sandblaster head which is effective in reinducting pollutants be generated.

A further object of the invention is to provide a quieter blaster head.

A still further object of the invention is to provide a blaster head which vibrates less to decrease the possibility of pollutant leakage.

A yet further object of the invention is to provide a blaster head which assures reinduction of the pollutants and or working abrasive even when unevenness is formed on the surface to be treated during sandblasting operation.

A still further object of the invention is to provide a blaster head which has a satisfactorily large capacity for inducting and collecting pollutant so that it may be applicable for sandblasting concrete constructions which generate large amounts of pollutant, such as mine dust, during sandblasting operation.

In order to accomplish the aforementioned and other objects, a sandblaster system, according to the present invention, employs a sandblaster head which includes an essentially bowl-shaped sandblaster hood defining an internal collecting chamber. A sandblaster nozzle is inserted into the internal collecting chamber of the sandblaster hood and directed toward a surface to be treated. The sandblaster nozzle is connected to a source of working abrasive, such as working sand, to inject or discharge the working abrasive with pressurized air onto the surface to be treated. A sucking nozzle is also inserted into the internal collecting chamber of the blaster hood for inducting pollutants, such as dust, mine dust, removed rust or metal and so forth generated in the blasting operation, along with the working abrasive. The sucking nozzle is connected to a vacuum source for drawing the pollutant and the working abrasive to be reinducted. On the other hand, the blaster hood is provided with, an elastic or resilient sealing member on the peripheral edge mating the surface to be treated. The sealing member elastically or resiliently maintains contact with the surface for establishing a dust-proof seal to assure prevention of pollution leakage.

A blaster head assembly for sandblasting comprises a blaster hood defining a blaster chamber therein exposed toward a surface to be treated, a sealing means, cooperative with the blaster hood, for establishing a seal between the blaster hood and the surface so as to block communication between the blaster chamber and the atmosphere, a blaster nozzle inserted into the blaster chamber through a first opening formed through the blaster hood, the blaster nozzle being connected to an abrasive blast source to be supplied a pressurized abrasive blast to be directed toward the surface, and a suction nozzle inserted into the blasting chamber through a second opening formed through the blasting hood and oriented at different position to that of the first opening, and connected to a vacuum source for creating vacuum pressure in the blasting chamber for sucking out a mixture of the abrasive blast and pollutant generated during blasting operation.

A sandblaster system comprises a abrasive blast source for supplying an abrasive blast with a predetermined pressure, a vacuum source, a blaster head assembly including a blaster hood defining a blaster chamber therein and exposed toward a surface to be treated, a sealing means, cooperative with the blaster hood, for establishing seal between the blaster hood and the surface so as to block communication between the blaster chamber and the atmosphere, a blaster nozzle inserted into the blaster chamber through a first opening formed through the blaster hood, the blaster nozzle being connected to the abrasive blast source to be supplied a pressurized abrasive blast to be directed toward the surface, and a suction nozzle inserted into the blasting chamber through a second opening formed through the blasting hood and oriented at different position than that of the first opening, and connected to the vacuum source for creating suction pressure in the blasting chamber for sucking out a mixture of the abrasive blast and pollutant generated during blasting operation, and an abrasive blast recovering means receiving the mixture sucked by the suction nozzle and separating the abrasive blast from other pollutant to feed to the abrasive blast source.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
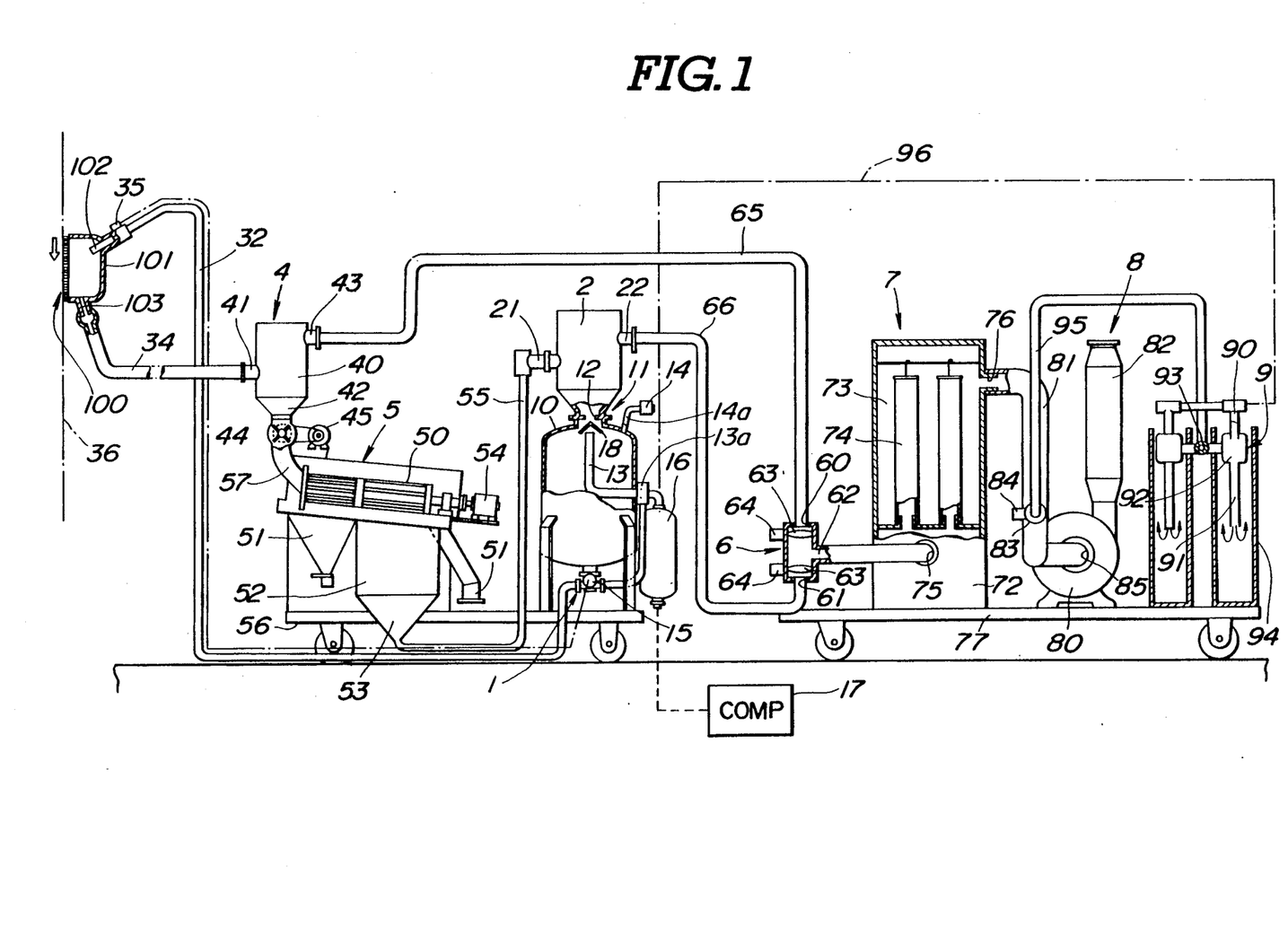
FIG. 1 is a side elevation of the preferred embodiment of a blaster system according to the present invention.

Referring now to the drawings, particularly to FIG. 1, the preferred embodiment of a blaster system, according to the invention, comprises a source assembly 1 constituted of a blasting machine. The source assembly 1 has a working abrasive collecting tank 2 and pressurizeable shot storage tank or as it will hereafter be referred to a blast tank 10. The working abrasive collecting tank 2 is in communication with the blast tank 10 via a shut-off valve assembly 11.

The source assembly 1 cooperates with a blaster head assembly 100 applied to a surface to be blasted which generally comprises a blaster hood 101, a sandblaster nozzle 102 and a sucking o nozzle 103. In practice, the blast tank 10 is connected to the blasting nozzle 102 of the sandblaster head assembly 100 via a supply hose 32 for feeding the working abrasive blast. The sucking nozzle 103 of the blaster head assembly 100 is connected via a collecting hose 34, to a filter assembly 4 which includes a cyclone filtering machine 40. The cyclone filtering machine 40 is communicated with a abrasive recovering machine 5 including a classifier 50 which classifies the collected mixture of dust and abrasive blast for recovering the abrasive blast, via an outlet valve 44. The abrasive blast divided by the classifier 50 is fed to the collecting tank 10 via an abrasive collecting hopper 52 and a feed pipe 55.

On the other hand, the cyclone filtering machine 40 of the filter assembly 4 is connected to a vacuum source assembly 8 via an air filter assembly 7. With this construction, a negative pressure is created in the sucking nozzle 103, the collecting hose 34, the filter assembly 4 for drawing the mixture of the abrasive blast and the pollutant into the internal collecting chamber of the blaster hood 101.

Various types of abrasive blasts such as silica sand and so forth can be used as the working abrasive. However, an abrasive blast made from slag created in a converter is considered to be best. In order to be used as abrasive blast, the slag is cooled and crushed to a grain size of 0.7 to 2.4 mm. The abrasive blast thus produced has a Vickers hardness of 700±100 Hv. The hardness is sufficient for use as abrasive blast. Further, since each grain has numerous sharp edges, this type of abrasive blast is effective for sandblasting. In addition, abrasive blast made from the slag is highly alkaline, i.e. pH 10, and may provide some corrosion resistance.

The shut-off valve assembly 11 provided between the collecting tank 2 and the blast tank 10 is designed for supplying a controlled amount of working abrasive blast, such as working sand, from the collecting tank to the blast tank 10. Also the shut-off valve assembly 11 serves for preventing the pressure in the blast tank 10 from being introduced into the collecting tank 2. The shut-off valve assembly 11 comprises a valve seat 12 and an essentially conical valve member 18. The valve member 18 is formed at its bottom with a connical rest opening. A pressure pipe 13 is directed upwardly and opposes to the conical rest of the valve member 18 at the upper end thereof. The pressure pipe 13 extends through the peripheral wall of the blast tank 10. The outer end of the pressure pipe 13 is connected to a pressure assimilator 16 which is, in turn, connected to an air compressor 17. A pressure control valve 13a is disposed in the pressure pipe 13 to establish and block communication between the pressure accumulator 16 and the blast tank 10. When the pressure is introduced into the blast tank 10, the pressurized air is discharged toward the conical rest of the valve member 18. By the pressure discharged through the outlet of the pressure pipe 13, the valve member 18 is shifted upwardly to seat onto the valve seat 12. Therefore, communication between the collecting tank 2 and the blast tank 10 is blocked. On the other hand, by the pressure introduced through the pressure pipe 13, the pressure in the blast tank 10 is held higher than that in the collecting tank 2. As a result, the valve member 18 is maintained at the position seated onto the valve seat 12 to block communication between the collecting tank 2 and the blast tank 10 by the pressure difference between those tanks.

The blast tank 10 is formed with a ventilation port connected to a ventilation pipe 14a. A pressure relief valve 14 is disposed in the ventilation pipe 14a. The pressure relief valve 14 serves to regulate the pressure in the blast tank 10 and or to ventilate the pressure in the blast tank for decreasing the pressure in the reservoir tank to the pressure lower than or equal to that in the collecting chamber 2 for introducing the working abrasive collecting in the collecting chamber into the blast tank 10. In order to adjust the pressure in the blast tank 10, the position of the pressure control valve 13a is controlled. For this purpose, a pressure sensor may be disposed within the blast chamber 10. The pressure sensor may be connected to a computer-based controller. The controller produces a pressure control signal to control the valve position of the pressure control valve 13a. On the other hand, in order to monitor the amount of the working abrasive blast in the blast tank, an abrasive amount sensor, such as a load cell, may be disposed within the blast tank 10. The controller produces an abrasive supply control signal to feed to the pressure relief valve 14 to open the latter, when the amount of the abrasive blast in the blast tank 10 decreases below a predetermined amount. Also, it would be preferable that the controller 13c also produce the supply control signal to open the pressure relief valve 14 when the pressure in the blast tank 10 exceeds a given pressure.

A flow control valve 15 is disposed between the outlet of the blast tank 10 and the supply hose 32. The valve position of the flow control valve 15 is electrically or electromagnetically controlled by a manually operable switch 35 provided adjacent the blaster nozzle 102. Such type of the flow control valve 15 has been disclosed in the Japanese Patent First Publication (Tokkai) Showa 53-16989, published on Feb. 16, 1978, for example. The disclosure of the above-identified Tokkai Showa 53-16989 is herein incorporated by reference for the sake of disclosure. Though the shown embodiment employs the manual switch for controlling the valve position of the flow control valve between open and closed positions, it would be possible to control the valve position by means of the controller, if desired. Furthermore, though the manual switch in the shown embodiment is provided adjacent the blaster nozzle, it would be possible to position the same at any position convenient for manual operation. In addition, the construction of the flow control valve is not limited to the type that disclosed in the Tokkai Showa 53-16989 but can be of any appropriate constructions which allows electrical or electromagnetical control through the manual switch or controller.

The cyclone filtering machine 40 of the filter assembly 4 is connected to the classifier 50 through funnel 42, a rotary valve 44 and an inlet pipe 57. The rotary valve 44 is driven by a driving motor 45 at a constant speed, Therefore, the rotary valve 44 meters given amount of the mixture of the pollutant and the working abrasive blast to the classifier 50. On the other hand, the rotary valve 44 prevents the vacuum pressure in the cyclone filtering machine 40 from being introduced into the classifier.

Various types of classifier may be employed as the classifier 50 for dividing the working abrasive blast from pollutant, such as the dust, mine dust and so forth. In the practical embodiment, the classifier 50 is rotatingly driven by means of a pnuematic motor 54. The pollutants, such as dust, mine dust, are introduced into hopper 51. On the other hand, the working abrasive blast divided from the pollutant by the classifier 50 is introduced into the collecting hopper 52. The outlet 53 of the collecting hopper 52 is connected to the collecting tank 2 via a feed pipe 55.

The collecting tank 2 is connected to one inlet port 61 of a two-way valve assembly 6 by pipe 66. The other inlet port 60 of the two-way valve assembly 6 is connected to an air outlet 43 of the cyclone filtering machine 40. The two-way valve assembly has an outlet port 62 connected to the vacuum source 8 through an air filter assembly 7. The two-way valve assembly 6 comprises a hollow valve housing 6a having inlet ports 60 and 61 and the outlet port 62. A pair of butterfly valve members 63 are disposed within the internal space of the valve housing. Respective butterfly valve members are adapted to establish and block communication between the cyclone filtering machine 40 and the air filter assembly 7 and between the collecting tank 2 and the air filter assembly 7. Respective butterfly valve members 63 are connected with an electric motors 64 to be driven by the latter to be controlled the valve positions thereof. The electric motors 64 are cooperative with each other to drive one of the butterfly valves to the closed position when the other drives the associated butterfly valve 63 to open position.

Preferably, the electric motors 64 are connected to the controller to be driven synchronously to each other by the valve position control signals from the controller.

The air filter assembly 7 comprises a filter housing 72 defining an air inlet 75 connected to the two-way valve 6. Essentially cylindrical air filters 74, such as bag filters, are disposed within the filter housing 72. The air introduced into the filter housing through the air inlet 75 passes through the air filters 74 and is discharged into a filter chamber 73. The filter chamber 73 is connected to an inlet 85 of a blower 80 in the vacuum source via an air outlet 76 and a vacuum duct 81. The vacuum duct 81 is also connected to an ejector assembly 9 via a switching valve 83. The switching valve 83 is associated with an electric motor 84 to be controlled to selectively connect the air filter assembly 7 to either the blower 80 or the ejector assembly 9.

The blower 80 has an outlet connected to a silencer 82 to discharge the air. The blower 80 has a large capacity for generating negative pressure for drawing the mixture of the pollutant and the working abrasive blast.

The ejector assembly 9 comprises a plurality of ejectors. Each of the ejectors comprise an enclosed casing 92 communicated with an injection pipe 90 at one end and with discharge pipe 91 at the other end. The injection pipe is connected to the pressure accumulator 16 via a pressure line 96. Each discharge pipe 91 is surrounded by a discharge drum 94 which has a glass wool layer on the inner periphery for absorbing noise created by the discharging high pressure air. The pressurized air from the pressure accumulator 16 is discharged from the injection pipe toward the enclosed casing. The discharged air passes through the internal space of the enclosed casing and discharges through the discharge pipe 94. This creates negative pressure or suction within the enclosed casing. The negative pressure created in respective enclosed casings is combined with that in the vacuum duct 81 via the vacuum hose 95.

In the shown embodiment, the filter assembly 4, the classifier 5 and the source assembly 1 are mounted on a carriage 56 so as to be movable in relation to the surface of the construction to be treated. Also, the air filter assembly, the vacuum source assembly 8 and the ejector assembly 9 are mounted on a carriage 77 in relation to the surface to be treated.

Figure 2:
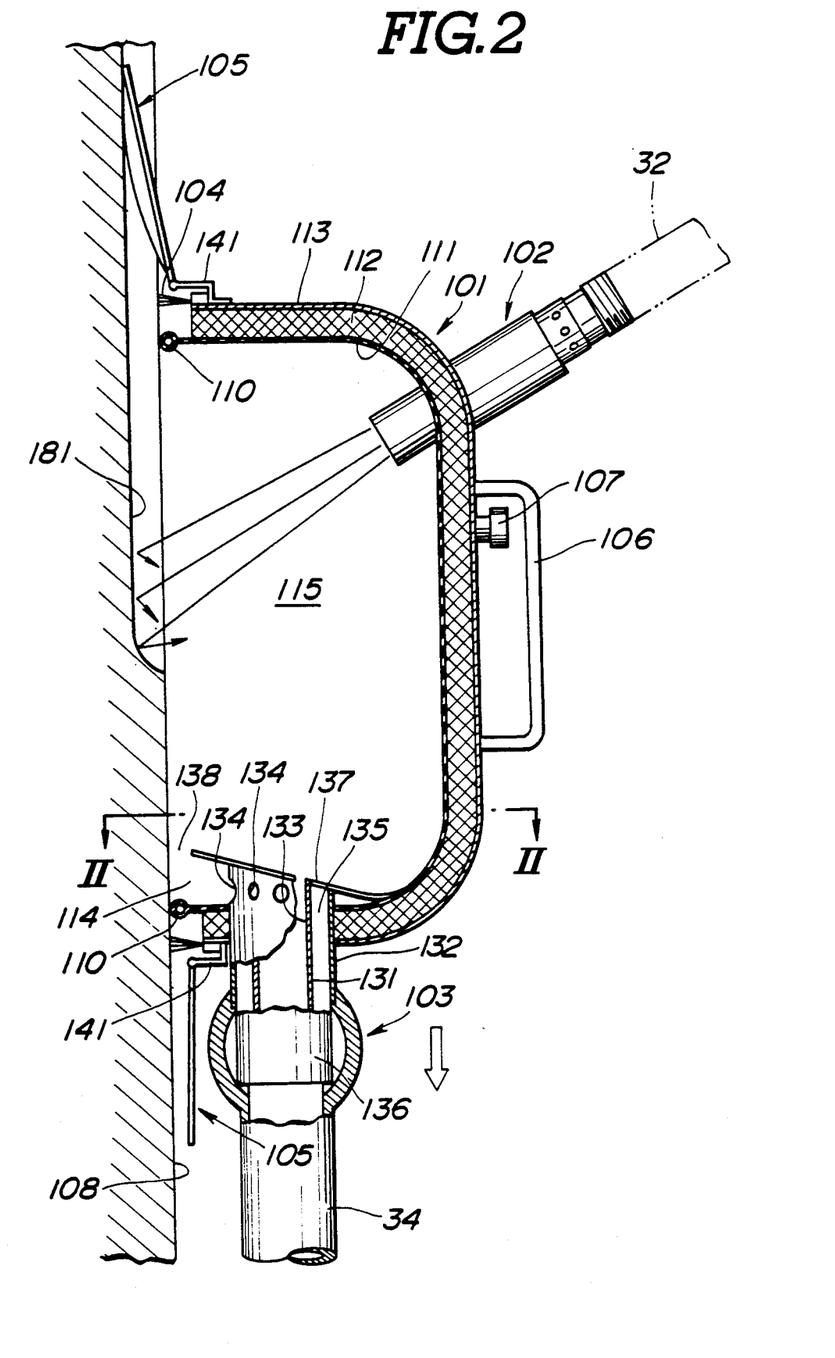
FIG. 2 is an enlarged section of a sandblaster head assembly employed in the preferred embodiment of the blaster system of FIG. 1.
Figure 3:
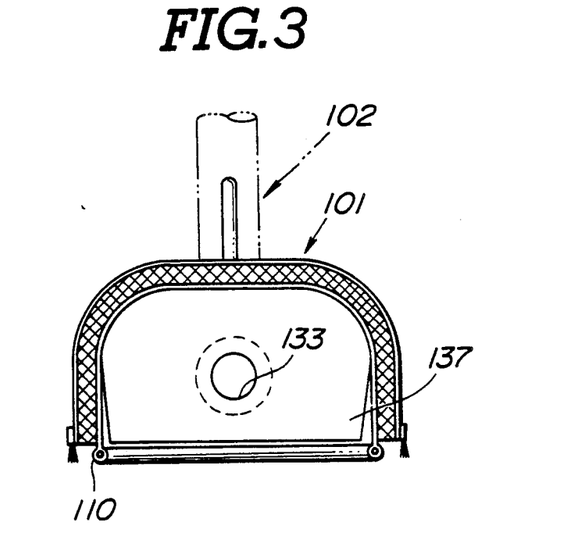
FIG. 3 is a section of the sandblaster head assembly taken along line III—III of FIG. 2.
Figure 4:
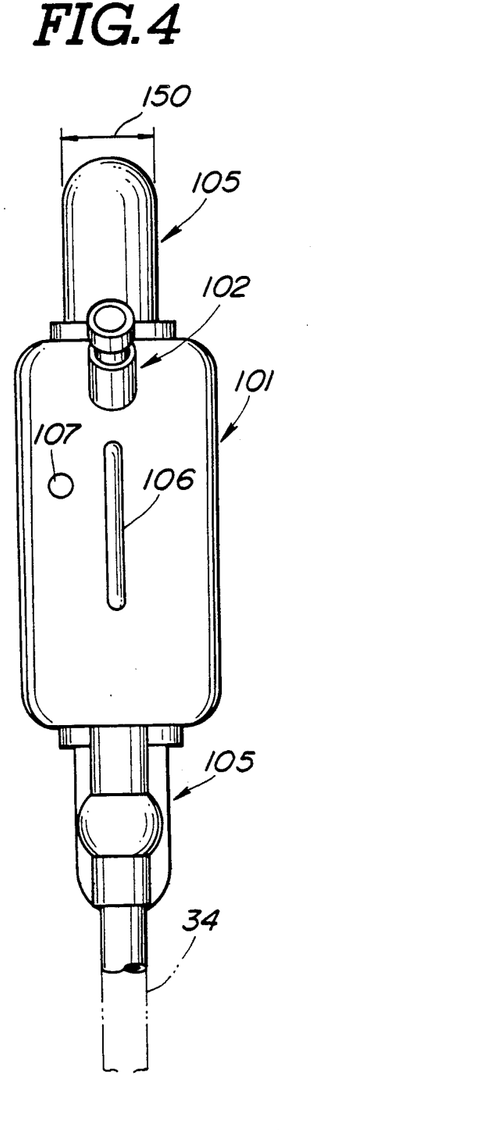
FIG. 4 is a back elevation of the sandblaster head assembly of FIG. 2.

FIGS. 2, 3 and 4 show the preferred construction of the blaster head 100. As seen herefrom, the sandblaster hood 101 is formed in a generally rectangular box shaped configuration with round corners. The peripheral wall of the blaster hood 101 comprises an outer plate 113, an intermediate layer 112 and an inner layer 111. The outer plate 113 is forms a steel damper plate pressed into the desired configuration. As is well known, the steel damper plate is of laminated construction formed of a pair of steel plates of a thickness in the range of 0.4 to 3.2 mm and an elastic resin sandwiched between the steel plates. The intermediate layer 112 is constituted of honeycomb board or foamed resin. The inner layer 111 is constituted by a wear resisting rubber layer. The inner layer 111 has an extension extending toward the surface to be treated from the edges of the outer plate 113 and the intermediate layer 112. The extension of the inner layer 111 has a cylindrical edge section 110. The cylindrical edge section 110 is designed to be elastically deformable to establish a dust proof seal between the surface to be treated and the sandblaster hood applied thereto.

A brush 104 is secured onto the edge of the outer plate 113 and extends toward the surface to be treated. The brush 104 is covered by means of a cover strip 141 which is rigidly secured onto the outer plate.

A handle 6 is secured on the outer periphery of the blaster hood. A vacuum adjusting valve 7 is also provided in the blaster hood. The vacuum adjusting valve may be manually operated to adjust the vacuum pressure in the blasting chamber 115 of the blaster hood 101 so that the vacuum pressure will not become too excessive to allow smooth movement of the blaster head along the surface to be treated.

The blaster nozzle 102 is inserted into the blasting chamber 115 of the blaster hood 101 through the opening formed through the peripheral wall. The opening which receives the blaster nozzle 102 is formed at the upper corner in tilted fashion so that the axis of the blaster nozzle 102 lies oblique to and downwardly inclined toward the surface to be treated. Therefore, when the blaster nozzle 102 is supplied the pressurized abrasive blast through the supply line 32 it injects the working abrasive blast toward the surface to be treated at an oblique angle. Thereby rust on a metal surface or the weathered surface of a concrete construction can be removed.

The sucking nozzle 103 is inserted into the blaster chamber 115 through the bottom of the blaster hood 101. As will be seen from FIG. 2, the sucking nozzle 103 is constituted of coaxially arranged inner pipe 133 and outer pipe 132. The outer pipe 132 is formed with a plurality of holes 134. An annular space 135 is thus defined between the inner and outer pipes 133 and 132. The annular space 135 and the internal space 33 of the inner pipe 133 are connected via a confluence section 136. The confluence section 136 is, in turn, connected with the collection hose 134.

A cover plate 137 is attached onto the inner periphery of the blaster hood 101 and encloses the blasting chamber 115. Within the cover plate 137, a collecting chamber 114 is defined around the upper end of the outer pipe 133 where the holes 134 are formed in alignment in peripheral direction. The cover plate 137 is formed with a small clearance 138 allowing communication between the blasting chamber 115 and the collecting chamber 114. With this construction, the internal space 133 of the inner pipe 133 is communicated with the blasting chamber 115 to the mixture of the pollutant and the abrasive blast therein to be evacuated. On the other hand, since the annular space 135 is blocked from communication with the blasting chamber by means of the cover plate 137 and communicates with the collecting chamber 114 through the holes 134, the mixture of the pollutant and the abrasive blast in the collecting chamber 114 is caused to pass through the annular space 135.

Figure 5:
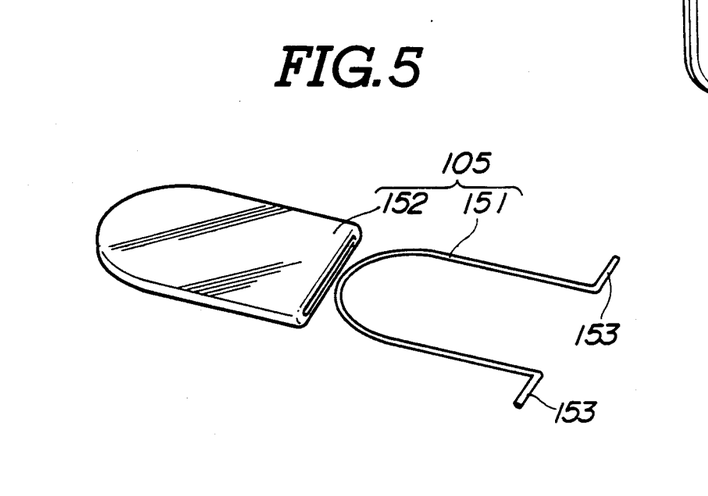
FIG. 5 is an exploded perspective view of a sealing strip employed in the preferred construction of the sandblaster head of FIG. 2.

A pair of sealing tangs 105 are pivotably connected to the free end of the cover strip 141. The upper sealing tang 105 extends upwardly from the blaster hood 101 and the lower sealing tang 105 extends downwardly from the blaster hood 101. As shown in FIG. 5, each of the sealing tang 105 comprises a metal wire frame 151 and a rubber bag 152 receiving the wire frame therein. The metal wire 151 is formed into basically a U-shaped configuration with transverse extensions 153 provided at both ends. The extensions 153 serve as pivot axles to pivotably engage with rests formed in the cover strip. In the shown embodiment, the width of sealing tang 105 corresponds to the width of the surface to be sandblasted. The sealing tangs 105 are free to pivot. Therefore, since there is negative pressure the blasting chamber 115 during sandblasting operation, the upper sealing tang 105 as a trailing tang is depressed thereby toward the concavity 181 in the surface 36 (see FIG. 1) which caused when the rust or weathered surface is removed. This assures a pollution proofing seal.

Though the unique construction of sealing tang as set forth above is employed in the preferred embodiment of the sandblaster system according to the invention, the sealing tang may be varied in construction. For example, the sealing tang can be formed of a resilient plate biased toward the surface 108 to be treated by means of a spring.

In operation of the preferred embodiment of the sandblaster system according to the invention, the pressure in the blast tank 10 is increased at a predetermined level by introducing pressurized air from the pressure accumulator 16. Then, either the blower 80 or the ejector 90 is driven to create a vacuum in the blaster head assembly through the collecting assembly 4 and the collection tank 2.

The pressurized working abrasive blast is fed from the blast tank 10 through the supply hose 32 to the blaster nozzle 102. The blaster nozzle 102 thus starts injection of the working abrasive blast toward the surface to be treated. The mixture of the abrasive blast and the pollutant, such as dust, mine dust, rust or so forth, is generated within the blasting chamber 115 of the blaster head assembly 100. Part of the mixture flows into the collecting chamber 114. The mixture in the blasting chamber 115 and the collecting chamber 114 is drawn by the suction nozzle 103 due to vacuum pressure and conducted through the collection pipe 134 into the cyclone filter machine 40. Through the filter machine 40, the air and the mixture of the abrasive blast and the pollutant are separated. The air is fed to the air filter through the vacuum hose 65 to the air filter assembly 7 to be ventilated through the blower 80 or the ejectors 90.

On the other hand, the mixture separated from the air in the filter machine 40 is fed to the classifier 50. The classifier 50 separates the abrasive blast from the pollutants. The pollutants are set into the hoppers 51 and the abrasive is collected in the hopper 52. When a given amount of the abrasive is collected in the hopper 52, the vacuum is created in the collection chamber through the two-way valve assembly 6. By the vacuum pressure in the collection tank 2, the abrasive in the hopper 52 is drawn into the collection tank through the collection pipe 55.

During the aforementioned operation, since the blasting chamber 115 in the blaster head assembly 100 is sealed in dust proofing fashion, the pollutant is prevented from flowing out to the atmosphere. Therefore, the possibility of causing pollution can be virtually eliminated. Furthermore, even when the blasting operation creates a groove on the surface being treated, the dust proof seal can be maintained by means of the sealing tang 105.

In the shown construction, the blaster hood 101 is constructed to absorb the noise created in the blasting chamber. Also, by employing the damper metal plate for forming the blaster hood, vibration of the blaster head assembly can be decreased.

It should be appreciated that, though the shown embodiment is depicted for a sandblaster system which is manually operated, it would be possible to perform blasting operation utilizing a kind of carriage, such as that disclosed in the U.S. Pat. No. 4,149,345, or otherwise utilizing a kind of robot.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A blaster head assembly for sandblasting comprising:
   a blaster hood defining a blaster chamber therein exposed toward a surface to be treated,
   a sealing means, cooperative with sand blaster hood, for establishing a seal between said blaster hood and said surface to block communication between said blaster chamber and the atmosphere;
   a blaster nozzle inserted into said blaster chamber through a first opening formed through said blaster hood, said blaster nozzle connected to an external abrasive blast source to supply a pressurized abrasive blast directed toward said surface; and
   a suction nozzle inserted into said blaster chamber through a second opening formed through said blaster hood and oriented at a different position to that of said first opening, and connected to an external vacuum source separated from said external abrasive blast source, for creating vacuum pressure in said blaster chamber for sucking out a mixture of said abrasive blast and pollutant generated during blasting operation.

2. A blaster head assembly as set forth in claim 1, wherein said seal means comprises a sealing tang provided at least at the trailing side of said blaster hood to sealingly contact with a blasted surface for assuring seal between said blaster hood and said blasted surface.

3. A blaster head assembly as set forth in claim 1, wherein said blaster hood is formed of a noise absorbing material.

4. A blaster head assembly as set forth in claim 1, wherein said sealing means comprises a strip extending from a peripheral edge of said blaster hood mating said surface to sealingly contact with said surface for establishing a seal.

5. A blaster head assembly as set forth in claim 4, wherein said strip is made of a rubber strip.

6. A blaster head assembly as set forth in claim 5, wherein said strip has an elastically deformable cylindrical section for sealingly contacting said surface.

7. A blaster head assembly as set forth in claim 5, wherein said seal means comprises a sealing tang provided at least at the trailing side of said blaster hood to sealingly contact with a blasted surface, said sealing tang being cooperative with said strip for assuring seal between said blaster hood and said blasted surface.

8. A blaster head assembly as set forth in claim 1, wherein said blaster hood is formed of a vibration damper plate.

9. A blaster head assembly as set forth in claim 8, wherein said blaster hood incorporates a layer formed of a noise absorbing material.

10. A blaster head assembly as set forth in claim 9, wherein said sealing means comprises a strip extending from a peripheral edge of said blaster hood mating said surface to sealingly contact with said surface for establishing a seal.

11. A blaster head assembly as set forth in claim 10, wherein said strip is made of rubber.

12. A blaster head assembly as set forth in claim 11, wherein said strip has an elastically deformable cylindrical section for sealingly contacting said surface.

13. A blaster head assembly as set forth in claim 12, wherein said seal means comprises a sealing tang provided at least at the trailing side of said blaster hood to sealingly contact with the blasted surface for assuring seal between said blaster hood and said sandblasted surface.

14. A blaster head assembly as set forth in claim 1, wherein said suction nozzle comprises a coaxially arranged inner and outer suction pipes defining a first suction path and an annular second suction path between said inner and outer pipes.

15. A blaster head assembly as set forth in claim 14, which further comprises a partition disposed within the internal space of said blaster hood for defining said blaster chamber at one side thereof and a collector chamber at the other side thereof, said partition incorporating means for establishing communication between said blaster chamber and said collecting chamber, said first suction path communicating with said blaster chamber and said second suction path communicating with said collecting chamber.

16. A blaster head assembly as set forth in claim 1, wherein said abrasive blast is made of a slag created in a converter.

17. A blaster head assembly as set forth in claim 16, wherein said abrasive blast has hardness of 700± 100 Hv in Vickers hardness.

18. A blaster head assembly as set forth in claim 16, wherein said abrasive blast is alkaline.

19. A sandblaster system comprising:
   an abrasive blast source including a carrier gas source for generating a pressurized air flow for carrying abrasive blast and an abrasive source for supplying an abrasive blast with pressurized carrier air flow;
   a vacuum source for generating a vacuum pressure;
   a blaster head assembly including a blaster hood defining a blaster chamber therein exposed toward a surface to be treated, a sealing means, cooperative with said blaster hood, for establishing a seal between said blaster hood and said surface to block communication between said blaster chamber and the atmosphere, a blaster nozzle inserted into said blaster chamber through a first opening formed through said blaster hood, said blaster nozzle being connected to said abrasive blast source via a first circuit to supply said pressurized abrasive blast directed toward said surface, and a suction nozzle inserted into said blaster chamber through a second opening formed through said blaster hood and oriented at a different position than that of said first opening, and connected to said vacuum source via a second circuit separately provided to said first circuit for introducing vacuum pressure in said blaster chamber for sucking out a mixture of said abrasive blast and pollutant generated during blasting operation and removing said abrasive blast and pollutant through said second circuit; and an abrasive blast recovering means associated with said abrasive source and connected to said second circuit for receiving said mixture sucked by said suction nozzle and separating said abrasive blast from other pollutant to feed to said abrasive blast source.

20. A sandblaster system as set forth in claim 19, wherein said abrasive blast source comprises a shut-off valve which is operable between an open position and a closed position be means of a switch provided adjacent said blaster head assembly.

21. A sandblaster system as set forth in claim 19, wherein said abrasive blast source comprises a blast tank connected to a pressurized air source, a collection tank connecting to said abrasive blast recovering means for receiving recovered abrasive blast therefrom, and a valve means disposed between said blast tank and said collecting tank for establishing and blocking communication therebetween.

22. A sandblaster system as set forth in claim 21, said valve means comprises a pressure difference responsive valve to move between an an open position to establish communication between said blast tank and said collecting tank and a closed position to block communication between said blast tank and said collecting tank.

23. A sandblaster system as set forth in claim 22, said collecting tank is connected to said vacuum pressure source for drawing said abrasive blast recovered by said abrasive blast recovering means thereinto.

24. A sandblaster system as set forth in claim 23, which further comprise a valve means disposed for selectively connecting said vacuum source to said collecting tank and said suction nozzle.

25. A blaster head assembly as set forth in claim 19, wherein said blaster hood is formed of a vibration damper plate.

26. A blaster head assembly as set forth in claim 19, wherein said blaster hood is formed of a noise absorbing material.

27. A blaster head assembly as set forth in claim 19, wherein said sealing means comprises a strip extending from a peripheral edge of said blaster hood mating said surface to sealingly contact said surface for establishing the seal.

28. A blaster head assembly as set forth in claim 27, wherein said strip is made of rubber.

29. A blaster head assembly as set forth in claim 28, wherein said strip has an elastically deformable cylindrical section sealingly contacting said surface.

30. A blaster head assembly as set forth in claim 28, wherein said seal means comprises a sealing tang provided at least at the trailing side of said blaster hood to sealingly contact with a blasted surface, said sealing tang being cooperative with said strip for assuring seal between said blaster hood and said blasted surface.

31. A blaster head assembly as set forth in claim 19, wherein said seal means comprises a sealing tang provided at least at the trailing side of said blaster hood to sealingly contact with a blasted surface for assuring seal between said blaster hood and said blasted surface.

32. A blaster head assembly as set forth in claim 19, wherein said suction nozzle comprises a coaxially arranged inner and outer suction pipes defining a first suction path and an annular second suction path between said inner and outer pipes.

33. A blaster head assembly as set forth in claim 32, which further comprises a partition disposed within said blaster hood for defining said blaster chamber at one side thereof and a collecting chamber at the other side thereof, said partition incorporating means for establishing communication between said blasting chamber and said collecting chamber, and said first suction path is communicated with said blasting chamber and said second suction path is communicated with said collection chamber.

34. A blaster head assembly as set forth in claim 19, wherein said abrasive blast is made of a slag created in a converter.

35. A blaster head assembly as set forth in claim 34, wherein said abrasive blast has hardness of $700 \pm 100$ Hv in Vickers hardness.

36. A blaster head assembly as set forth in claim 34, wherein said abrasive blast is alkaline.

37. A blaster head assembly for sandblasting comprising:
a blaster hood defining a blaster chamber therein exposed toward a surface to be treated;
sealing means associated with said blaster hood for establishing a gas tight seal to prevent pressurized abrasive blast and pollutant from discharging into the atmosphere;
a blaster nozzle inserted into said blaster chamber through a first opening formed through said blaster hood, said blaster nozzle connected to a first external circuit connected to an external abrasive blast source and including a pressurized air source for generating pressurized air serving as a carrier for abrasive blast and an abrasive blast source for supplying said abrasive blast with the pressurized carrier air to discharge the abrasive blast with a given pressure toward said surface; and
a suction nozzle inserted into said blaster chamber through a second opening formed through said blaster hood and oriented at a different position to that of said first opening, and connected to a second external circuit which is connected to an external vacuum source separate from said external abrasive blast source, for creating vacuum pressure in said blaster chamber for sucking out a mixture of said abrasive blast and pollutant generated during blasting operation and removing said abrasive blast and pollutant from said blaster chamber through said second circuit.

38. A blaster head assembly for sandblasting, which blaster head assembly is adapted for performing a blasting operation on a surface creating a large amount of dust or abraded surface material, comprising;

a blaster hood defining a blaster chamber therein exposed toward a surface to be treated;

sealing means associated with said blaster hood for establishing a gas tight seal to prevent pressurized abrasive blast and pollutant from discharging into the atmosphere;

a blaster nozzle inserted into said blaster chamber through a first opening formed through said blaster hood, said blaster nozzle connected to a first external circuit connected to an external abrasive blast source and including a pressurized air source for generating pressurized air serving as a carrier for an abrasive blast and an abrasive blast source for supplying said abrasive blast with the pressurized carrier air to discharge the abrasive blast with a given pressure toward said surface; and a suction nozzle inserted into said blaster chamber through a second opening formed through said blaster hood and oriented at a different position to that of said first opening, and connected to a second external circuit which is connected to an external vacuum source separate from said external abrasive blast source, for creating vacuum pressure in said blaster chamber for sucking out a mixture of said abrasive blast and pollutant generated during blasting operation and removing said abrasive blast and pollutant from said blaster chamber through said second circuit.

39. A blaster head assembly for sandblasting, which blaster head assembly is adapted for performing a blasting operation on a surface of a concrete wall, creating a large amount of dust or abraded surface material, comprising;

a blaster head defining a blaster chamber therein exposed toward a surface to be treated;

sealing means associated with said blaster hood for establishing a gas tight seal to prevent pressurized abrasive blast and pollutant from discharging into the atmosphere;

a blaster nozzle inserted into said blaster chamber through a first opening formed through said blaster hood, said blaster nozzle connected to a first external circuit connected to an external abrasive blast source including a pressurized air source for generating pressurized air serving as a carrier for an abrasive blast and an abrasive blast source for supplying said abrasive blast with the pressurized carrier air to discharge the abrasive blast with a given pressure toward said surface; and a suction nozzle inserted into said blaster chamber through a second opening formed through said blasting hood and oriented at a different position to that of said first opening, and connected to a second external circuit which is connected to an external vacuum source separate from said external abrasive blast source, for creating vacuum pressure in said blaster chamber for sucking out a mixture of said abrasive blast and pollutant generated during blasting operation and removing said abrasive blast and pollutant from said blaster chamber through said second circuit.

40. A sandblaster system adapted for performing a blasting operation on a surface and creating a large amount of dust or abraded surface material, comprising;

an abrasive blast source including a carrier gas source for generating a pressurized air flow for carrying abrasive blast and an abrasive source for supplying abrasive blast with pressurized carrier air flow, said abrasive blast source positioned remove from said surface to be treated;

a vacuum source for generating a vacuum pressure, said vacuum source positioned remote from said surface;

a blaster head assembly including a blaster hood defining a blaster chamber therein exposed toward said surface to be treated, a sealing means, cooperative with said blaster hood, for establishing a seal between said blaster hood and said surface to block communication between said blaster chamber and the atmosphere, a blaster nozzle inserted into said blaster chamber through a first opening formed through said blaster hood, said blaster nozzle being connected to said abrasive blast source via a first circuit to supply said pressurized abrasive blast directed toward said surface, and a suction nozzle inserted into said blaster chamber through a second opening formed through said blaster hood and oriented at a different position to that of said first opening, and connected to said vacuum source via a second circuit separately provided to said first circuit for introducing vacuum pressure in said blaster chamber for sucking out a mixture of said abrasive blast and pollutant generated during blasting operation and removing said abrasive blast and pollutant through said second circuit; and an abrasive blast recovering means associated with said abrasive source and connected to said second circuit, for receiving said mixture sucked by said suction nozzle and separating said abrasive blast from other pollutant to feed to said abrasive source.

* * * * *